United States Patent [19]

Weyrauch et al.

[11] Patent Number: 5,020,894
[45] Date of Patent: Jun. 4, 1991

[54] EYEPIECE AND LENS CAP FOR A SIGHTING TELESCOPE

[75] Inventors: Adolf Weyrauch; Bernd Dorband; Ferdinand Schlipf, all of Aalen, Fed. Rep. of Germany

[73] Assignee: Carl-Zeiss-Stiftung, Heidenheim/Brenz, Fed. Rep. of Germany

[21] Appl. No.: 557,330

[22] Filed: Jul. 23, 1990

[30] Foreign Application Priority Data

Jul. 22, 1989 [DE] Fed. Rep. of Germany ... 8908923[U]

[51] Int. Cl.⁵ .............................................. G02B 23/16
[52] U.S. Cl. ................................................... 350/587
[58] Field of Search ................. 350/587, 578; 24/301, 24/128, 17 B, 482, 265 A

[56] References Cited

U.S. PATENT DOCUMENTS 3,426,433 2/1969 Anderson ............................. 350/587
3,496,642 2/1970 Pfahler ................................. 350/587

FOREIGN PATENT DOCUMENTS 7630717 2/1977 Fed. Rep. of Germany .
3343554 6/1985 Fed. Rep. of Germany ........ 24/128

Primary Examiner—Jon W. Henry
Attorney, Agent, or Firm—Eugene Stephens & Associates

[57] ABSTRACT

Cover caps to protect the lens and eyepiece of a sighting telescope are resiliently connected by a pair of elastic bands. Each cap is provided with a pair of respective axially-oriented channels, each channel being larger at the end in proximity to the front of its respective cap, and the smaller end of each channel is proportioned to permit one end of one of the elastic bands to be threaded therethrough. Each end portion of each band is first threaded through a respective one of the channels, and then each end portion is folded over and secured to itself to form a thickened endpiece. Thereafter, each endpiece is retracted into its respective channel.

3 Claims, 1 Drawing Sheet

EYEPIECE AND LENS CAP FOR A SIGHTING TELESCOPE

FIELD OF THE INVENTION

The present innovation relates to eyepiece and lens caps, connected by elastic bands, for covering and protecting sighting telescopes.

BACKGROUND

Sighting telescopes, such as those used with or mounted on hunting rifles, are often protected against soiling and damage by lens caps which are positioned over the eyepiece and the lens of the telescope when the latter is not in use. Generally, these caps are cup-shaped, having a front side and an axially-extending skirt portion made from a deformable material, and they are proportioned so that they can be press-fitted over the lens end and eyepiece end, respectively, of the telescope. Accordingly, the two caps have different diameters and are held in place primarily by friction forces. To prevent the individual caps from becoming lost, the two caps are often connected to each other by straps or elastic bands. When elastic bands are used, they are proportioned so that the bands are under tension When the caps are positioned over the respective ends of the telescope, thereby providing additional tension forces for holding the caps in place.

Such lens cap combinations are well-known (e.g., see German Utility Model 76 30 717). In these known protective combinations, the bands are often fastened to the protective caps by means of metal rivets with sharp metal edges. The rivet holes tend to stretch and tear from the tension of extended use, and the metal rivets and their sharp edges pose a threat of injury to the user and to the telescope.

These problems related to the use of metal rivets are solved by the present innovation, which provides a novel construction for interconnecting the lens caps and bands while avoiding the disadvantages of the prior art.

SUMMARY OF THE INVENTION

In accordance with the improved construction disclosed herein, the lens caps are provided with lateral extensions, each having an axially-oriented rectangular channel for receiving and holding respective ends of the bands. The rectangular channels are proportioned so that the size of the channel opening which is in proximity to the front side of the cap is larger than the opening at the opposite end of the channel, and the smaller end of the channel is proportioned to permit one end of a band to be threaded through it. After each of the respective band ends has been threaded through its appropriately associated channel, it is folded over and secured to itself (e.g., by staples, mastic, etc.) to form a thickened endpiece which is then retracted to a position within its respective channel.

This novel construction is remarkably simple and inexpensive. The staples are covered, and the design readily permits the application of greater tension between the caps without resulting in the tearing or loosening of the connections between the band and caps and without exposing the user or the telescope to sharp metal edges. In addition, the appearance of the resulting combination is visually elegant.

DRAWINGS

DETAILED DESCRIPTION

Figure 1:
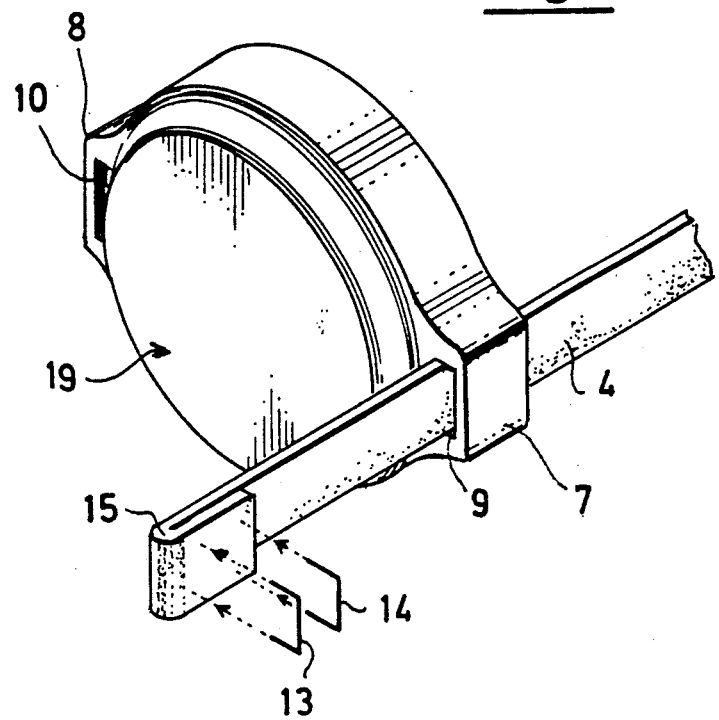
FIG. 1 is a perspective illustration of a partial construction of a lens cap and connecting band in accordance with the invention.
Figure 2:
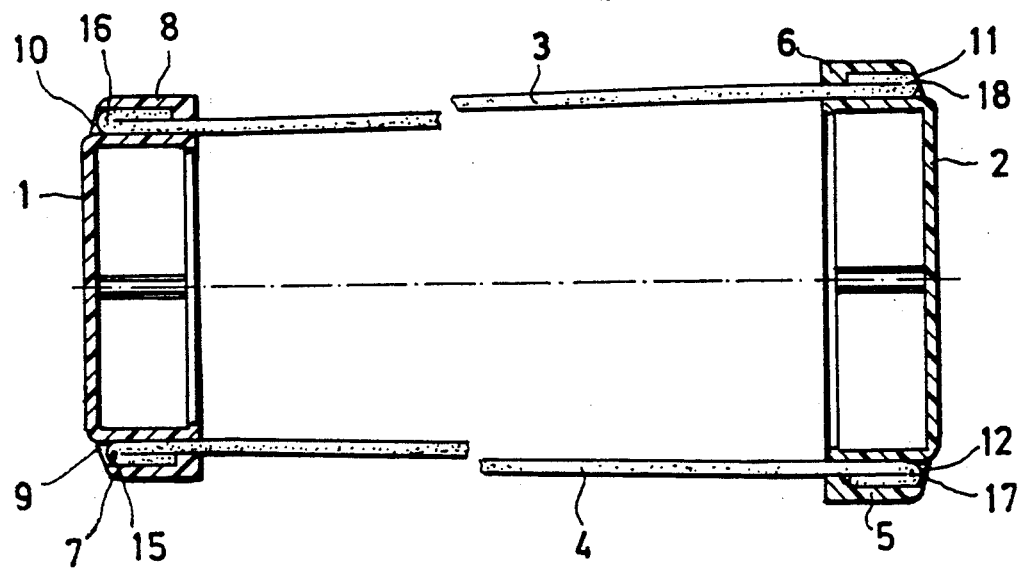
FIG. 2 is a longitudinal section through the inventive combination in completed form, showing an eyepiece cap and a lens cap connected by bands.

The drawings show an eyepiece cap 1 and a lens cap 2. The caps are connected to each other by elastic bands 3 and 4. Each cap has lateral extensions 5, 6, 7, 8 formed in its respective axially-extending skirt portion, and each lateral extension is provided with an axially-oriented rectangular channel 9, 10, 11, 12. The size of the opening of each channel 9, 10, 11, 12, which is in proximity to the front face 19 of its respective cap, is greater than the size of the opening at its opposite end, the latter being sized to permit the end of an elastic band to be tightly threaded through it.

To connect caps 1 and 2 by means of elastic bands 3, 4, the ends of the bands are threaded in an axial direction through the respective channels 9–12 of the lens and eyepiece caps so that each end projects from the larger opening of its respective channel. Each projecting band end is then folded over and secured with respective staples 13, 14 to form a thickened endpiece 15, 16, 17, 18. Thereafter, said thickened endpieces 15–18 are retracted into their respective channels where they are fixed by deformation and friction forces.

It will be appreciated that the folded endpieces 15–18 may be secured by means other than staples, such as mastic, thermal bonding, etc.

We claim:

1. In a combination lens cap and eyepiece cap for a sighting telescope, said caps each having a front side and an axially-extending skirt portioned proportioned to surround and cover the lens end and the eyepiece end, respectively, of the telescope, said caps being connected to each other by bands, the improvement wherein:

the axially-extending skirt portion of each of said caps includes lateral extensions, each lateral extension being provided with an axially-oriented rectangular channel therethrough, the size of each said rectangular channel opening in proximity to the front side of the cap being larger than the size of the opening at its opposite end, while the smaller end of said channel is proportioned to permit one end of one of said resilient bands to be tightly threaded therethrough;

each end portion of each of said resilient bands extending through a respective one of said channels, being folded over, and being secured to itself to form a thickened endpiece; and each thickened endpiece being positioned within its respective channel.

2. The combination of claim 1 wherein said bands comprise an elastic material whereby the bands may be under tension whenever said caps are positioned over the respective ends of said telescope.

3. The combination of claim 1 wherein each said folded over end portion is secured to itself with staples.

* * * * *